Patented Nov. 21, 1950

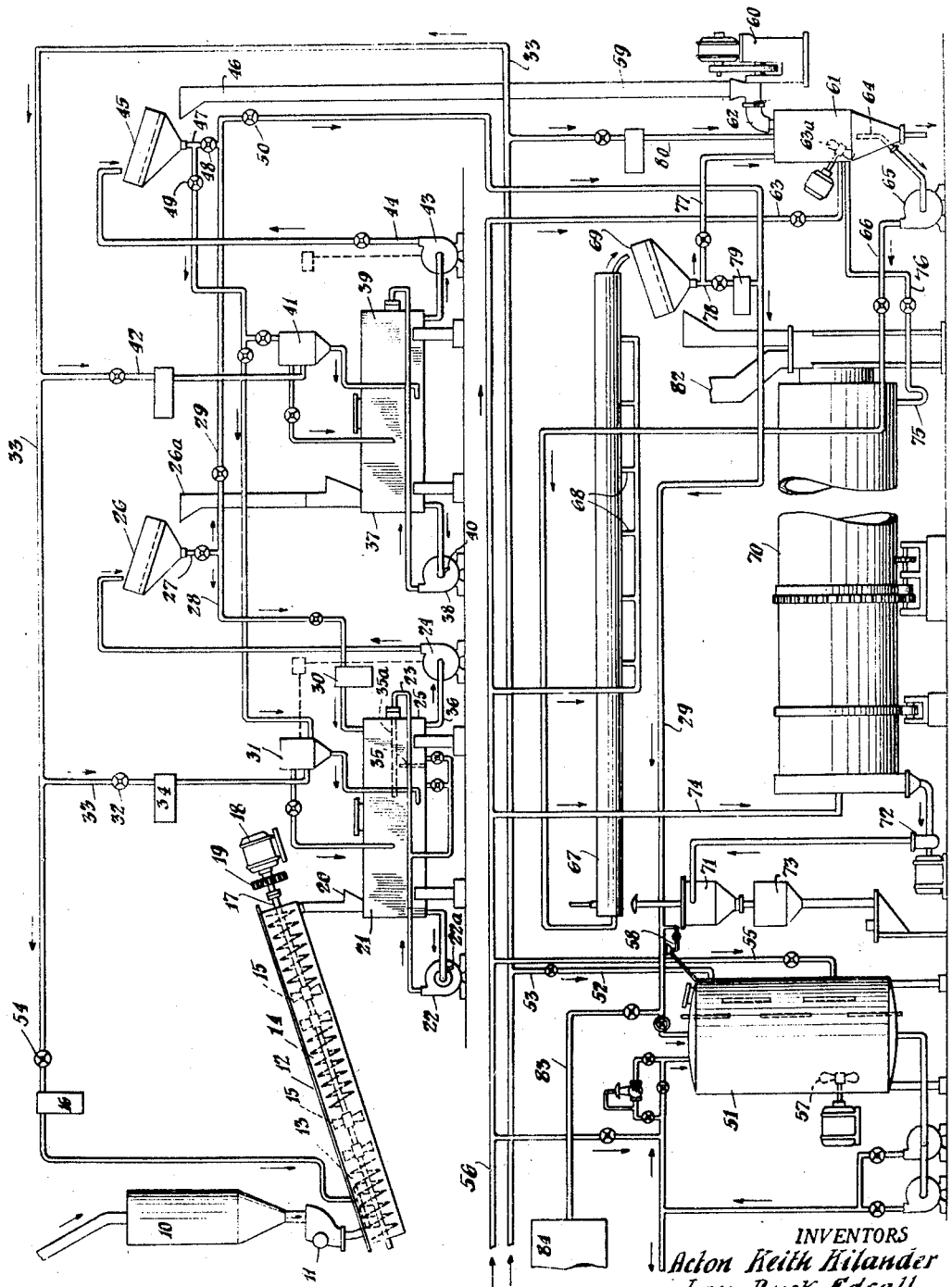

2,530,823

UNITED STATES PATENT OFFICE 2,530,823

METHOD AND APPARATUS FOR SEPARATING STARCH FROM GLUTEN

Acton Keith Kilander, Gibralter, and Lou Buck Edsall, Wyandotte, Mich., assignors, by mesne assignments, to Trenton Chemical Company, Trenton, Mich., a corporation of Michigan Application April 8, 1944, Serial No. 530,228

19 Claims. (Cl. 127—25)

This invention relates to gluten recovery and is herein illustrated as embodied in a continuous process and apparatus for separating gluten from wheat flour so as to yield a gluten low in oil, and having other advantages, and also yielding more starch and starch in a form especially suitable for commercial purposes and for the separation of more wheat oil than has hitherto been deemed commercially possible.

The device is also well adapted to be built of standard commercially available units, thus avoiding the expense incidental to especially constructed parts.

Starch or gluten or both have hitherto been produced from grain by several alternative processes, some of which steep the grain in warm water, some of which involve one or more chemical steps, some ferment to produce alcohol before separating out the gluten, and some involve other complicated steps.

One factor that has caused the adoption of these steps arises from the diverse physical and chemical properties of starch and gluten. Gluten usually is produced or freed from the accompanying starch under such conditions that it tends to form large, sticky, viscous lumps that drop in water, whereas starch, although usually heavier, disperses in cold water as more or less fine powder which is rather easily suspended in cold water.

The gluten lumps tend to entangle starch in many processes and thus many processes proved expensive through loss of starch and injury to the value of the gluten protein by reason of entangled starch.

Fermenting the grain before removal of the gluten injured the quality of the gluten eventually recovered, required larger fermenters, both directly and by reason of increased foam, required the frequent cleansing of continuous stills, and introduced other difficulties.

According to the present invention the foregoing and other difficulties and objections are overcome, and procedure is provided which recovers gluten more completely, and produces a gluten preferable to the glutens hitherto commercially produced, partly by reason of smaller oil content and smaller starch content.

One valuable step in the present invention preserves the gluten in aqueous pumpable suspension, and thus enables the gluten to be thoroughly washed while still in relatively small masses.

In the form shown, the invention utilizes a quasi-counter-current washing of the gluten by subjecting the gluten-containing material to two washings and effecting at least part of the first washing by the dilute starch water obtained in the second washing operation.

In the form shown, the present invention further cleanses the ground gluten by agitation in hot water which is described as hot enough to serve as devitalizer, and this agitation is shown as followed by a second agitation in hot water. It is found that these two hot water agitations, when more fresh water is used in the second agitation, produce a gluten which is 2% to 3% purer than is otherwise obtained.

The gluten is then described as dried and the condensate from the drier going to the first hot water agitator.

The process is capable of being so operated that a starch water is obtained which is suitable for efficient fermentation without concentration and that at the same time substantially all the starch is recovered from the gluten and a gluten is obtained of a purity hitherto deemed commercially impossible.

Other features and advantages will hereinafter appear.

The accompanying drawing shows diagrammatically apparatus for carrying out one form of the invention, numerous parts being compressed to simplify the disclosure.

In the form of the invention shown, ground grain in the form of flour, about forty-mesh or finer, from which bran has been removed is fed in measured quantities from a bin 10 through a measuring feeding device 11, which may be a Draver feeder, into the lower end of a mixer 12, diagrammatically shown as an inclined spiral screw feeder with interruptions 13 of the spiral 14 and small paddles 15 at intervals to feed backwardly a portion of the material at intervals, thus effectively stirring the whole. Where added capacity is needed, two such feeders may feed in parallel.

The amount of bran removed from the flour or grain will vary with the purpose to which the gluten-free starch is to be used. In the manufacture of alcohol about sixteen per cent of the wheat is usually to be removed as bran, while for the production of starch for many other uses, about twenty-five or thirty per cent of the wheat is often removed as bran and middlings.

Measured quantities of water, conveniently measured by a manometer 16, are delivered to the mixer 12 on top of the charge of flour in it, and this water is usually fresh water but may be surplus water from a later step, described below.

The mixer 12 is shown as having a shaft 17 to which the spiral 14 and the paddle 15 are fast, and as including a motor 18 to drive the shaft through suitable gearing 19.

It is found that a pound of water to every pound of flour is a satisfactory charge for the mixer 12 with many flours, although rather less water is often equally satisfactory. It is only needful that enough water be present to enable the mixer 12 to convey the flour and not so much water as to make the dough too soupy. An inclination of about 15° seems most satisfactory. The best results are obtained when the finished dough is about 90° F. to 105° F.

The dough from the mixer 12 is shown as dropping through an inspection chute 20 into a primary washer 21, shown as an open rectangular tank, and containing enough water to keep a mixture of about four pounds of water to one pound of flour. This maintains a specific gravity of about 1.075. The washing process is found to work best at a lower temperature than that used for mixing the dough. Thus washing at a temperature of 40° F. to 80° F. is found most satisfactory.

Here the aqueous suspension of flour is agitated, and in the form shown the agitation is maintained by withdrawing part of the suspension by a centrifugal pump 22 (of the sewer-trash type) from the bottom of the receiving end of its washer 21, and returning it by a pipe 23 from the pump near the top of the liquid at the other end of the washer 21.

The agitated suspension of fine starch and of small gluten aggregates is drawn by a pump 24 of less capacity, withdrawing the suspension from the end 25 remote from the feed end, and sending on the suspension to an inclined primary dewatering screen 26 which is much more efficient if the mesh is a perforated metal sheet and vibrates, thus avoiding blocking of the mesh by clinging gluten.

It seems advantageous to provide the screen 26 with fine mesh at the upper end where the starch-gluten-water mixture falls upon it, and with coarser mesh zone or zones lower down where the somewhat agglomerated gluten are in coarser particles.

The screen 26 is shown as delivering the dewatered gluten to a chute 26a, and delivering the starch-bearing water to a valved pipe system 27 which is adapted to split the starch-bearing water, returning some by a valved pipe 28 to the washer 21, and sending some by a valved pipe 29 to final use.

The pipe 28 which leads to the washer 21 is shown as including a manometer 30 to indicate the rate of return water flow. There is also shown a float tank 31 including a valve 32 in a fresh water line 33 to maintain the desired level and specific gravity in the tank 21. The line 33 may include a manometer 34.

In the form shown, the withdrawing pump 24 withdraws starch-bearing water from behind a weir 35 which forms a quiet pool around the pipe 36 by which the pump 24 withdraws the suspension from the bottom of the washer 21.

The agitation pump 22 is shown as provided with a valved air inlet 22a on its suction side to admit air if that proves advantageous in handling the gluten and is shown as delivering the agitated suspension to the washer 21 through a long horizontal pipe 35a above the weir 35 and below the liquid level in the washer 21.

The gluten separated on the screen 26 and carried down the inspection chute 26a is shown as delivered to the end of a secondary washer 37, also shown in the form of a rectangular tank, and also adapted to agitate its contents as by a circulating sewer-trash centrifugal pump 38 which withdraws the suspension from that end of the tank 37 and returning it to the further end 39, and also including a valved air inlet 40 on the suction side to admit air when advantageous.

The secondary washer is also shown as provided with a float control 41 to control the liquid level in the tank 37. The tank 37 is shown as adapted to receive water either from the fresh water line 33 through valved pipe 42 or starch water from the secondary dewatering screen now to be described.

Preferably all fresh water comes to the washers 21 and 37 through the pipe 42, although sometimes fresh water goes direct to the primary washer 21.

The liquid suspension of fine starch and small aggregates of gluten in the secondary washer 37 are shown as withdrawn from the bottom of the end 39 by a centrifugal pump 43 delivering it through a valved pipe 44 to the inclined secondary dewatering vibrating screen 45 which may be zoned in varying mesh and otherwise like the the primary dewatering screen 26, but which may be smaller because of less liquid and starch to be handled. The screen 45 is shown as delivering the gluten to a chute 46, and delivering the starch-water by a valved pipe system 47 in which it is split at will by valves 48 and 49 to the starch-water line 29 and to the float chamber 41.

The starch-water line 29 is generally adjusted, through its valves 48 and the valve 50 in the system 27, to deliver the starch-water at most effective concentration to a mash water tank 51 for fermentation, and by proper adjustment of the valves that concentration is obtained directly, although the tank 51 may be provided with a valved pipe 52 connected to the fresh water line 33 extending from the line 33 which also supplies the mixer 12 through a valved pipe 54.

The tank 51 is also shown as connected by a valved pipe 55 to a steam line 56, and provided with a motor-driven agitator 57. If desired, a gravity tester 58 may be interposed between the starch-water line 29 and the tank 51 to enable an operator to control the concentration of the solution in the tank 51.

Where starch is being produced for shipment as starch other devices will be substituted for the tank 51.

The gluten, from which starch-water has drained on the secondary dewatering screen 45, feeds by vibration of the inclined screen 45 into an extension chute 46, 59 which is shown as delivering the now well-washed gluten to an extruder or meat-grinder type of grinding machine 60 for further treatment. The extruded shreds or ground gluten is shown as carried from the grinder 60 to a primary devitalizing and hot washing tank 61 by a chute 62. The tank 61 may have a valved steam pipe 63 from the steam line 56 carried in, near its bottom, to agitate the water carrying the gluten in the tank and that may be further agitated as by a side-entrance stirrer 63a. The tank 61 is preferably kept at boiling temperature.

The water-borne gluten in the tank 61 is shown as withdrawn through a pipe 64 by a centrifugal pump 65, and as carried by a valved line 66 to a second devitalizer and hot water tank 67 shown as an inclined 12 inch pipe, fifty feet long, and receiving steam through several spaced bottom inlets 66 to keep it at boiling temperature and agitate the contents.

The pipe devitalizer 67 may be horizontal, but seems more efficient at 30° slope.

The devitalizer 67 is shown as delivering the hot washed water-borne gluten to a vibrating inclined screen 69 which separates off the water and is shown as delivering the gluten to a rotary drier 70 where the water evaporates off and from which the now finished gluten, often 89% pure, is carried by a blower 72 to a cyclone separator 71 and thence falls into a storage bin 73.

The dryer 70 is shown as heated by a valved steam line 74 from the steam line 66.

It is found useful to take the condensed steam from a steam trap 75 in the drier 70 by a valved line 76 to provide water for the primary devitalizer 61. The separated water from the gluten separating screen 69 may be sent at will to the starch-water line 29, or to the primary devitalizer 61, by valved pipes 77 and 78, the latter including a manometer 79 for convenience in seeing what adjustments in control are needed. It may also be wasted (taken out of the gluten system) if it has accumulated too many impurities.

The primary devitalizer 61 is also shown as connected by a valved pipe 80 to the fresh water line 33, thus enabling water control to be universal at this point.

Any uncondensed steam of the drier 70 may be conveyed off by a vent stack 82.

It is found that Detroit city water, supplied through the line 33 and used as described, yields the described 89% pure gluten—the last 2% or 3% of impurity being removed in the hot water devitalizer treatment.

Instead of being delivered to the mash water tank 51, the starch water coming through the line 29 may be delivered by a valved pipe 83 to a starch separating and drying device diagrammatically shown as contained in a housing 84 to produce dried starch suitable for marketing in that form.

It will be observed that the agitating devices for the primary and secondary washing tanks provide for entangling air if, and when that proves useful in separating the gluten, to which air adheres under some conditions, from starch, to which air does not adhere.

The present invention provides the possibility of separating gluten from starch preliminarily in the cold, or at room temperature, and finally removing the last 2% to 3% of starch in hot water, so that most of the starch is wholly unchanged by the process, and, if desired, that unchanged starch separated by hot water is collected separately for other uses.

Where wheat gluten is being collected, there may be some removal of wheat oil in the hot-water so-called devitalizers, but it does not separate from the water at that time without further treatment, as by extraction by immiscible solvents.

The gluten often separates at the primary washer in tacky lumps or strings which, if desired, may be made to float by adhesion of air bubbles, or, for special purposes, may be collected on the surface of a table and scraped off.

The secondary washer, for some purposes, may be so operated that it is conducted in fresh water or water containing less starch than one part of starch to twenty of water.

By properly operating the process, the gluten is always pumpable by a centrifugal pump. To efficiently effect this pumping the wet gluten, which includes about 60% water, should ordinarily be carried in four to five times the weight of water.

Having thus described one embodiment of the invention, what is claimed is:

1. The process which comprises making a dough out of ground grain and water with at least part of the bran removed, agitating the dough with enough added water to make a mixture of about four pounds of water to one pound of ground grain present, so as to separate the starch of the grain as a fine suspension carrying gluten aggregates from the grain, separating screening that first fine suspension from the aggregates, reagitating the separated aggregates with water and screening more fine starch suspension from the aggregates, returning said more fine suspension to serve as water for the first agitation, collecting the gluten, and carrying off the starch in the first fine suspension.

2. The process which comprises agitating ground grain with at least part of the bran removed with water to form a dough, and then with cold water to form a suspension of fine starch and gluten aggregates, separating out the aggregates from the starch suspension, reagitating the aggregates with cold water to form a further fine starch suspension carrying the aggregates, separating the aggregates from said further fine starch suspension, returning the separated suspension of starch to the first agitation, grinding the aggregates, and washing the ground aggregates with hot water, and returning the wash water to the second agitation.

3. The process which comprises first agitating ground grain with about an equal weight of water, after removal of a substantial amount of bran, to form a dough, agitating said dough with more water so that the agitation takes place with about four times as much solids as water present to form a fine starch suspension carrying aggregates of gluten, screening the suspension to remove the gluten, reagitating the removed gluten with water to form a second fine starch suspension, screening the second suspension to remove the gluten, returning the second fine starch suspension to the dough to provide the water for the first agitation, and collecting the gluten removed therefrom.

4. The process which comprises first agitating flour at least partly freed from bran with water to form a dough and then with added water to form a suspension in about four times its weight of water by pumping it by a centrifugal pump in and out of a tank, separating the resulting aggregates of gluten from the resulting fine starch suspension by screening, further agitating the screened-out gluten in further water by pumping it by a centrifugal pump in and out of a tank to further separate fine starch suspension from the gluten, separating the further fine-starch suspension from its gluten by screening, returning the further fine starch suspension to the first agitation to provide the water therefor, and collecting the gluten.

5. The process of separating starch from gluten which comprises agitating gluten-carrying flour at least partly freed from bran with water to make a dough at a temperature of about 90° F. to 105° F., thereafter agitating the dough with added water at a temperature of about 40° F. to 80° F. separating the major part of the starch from the gluten, agitating the separated gluten with further added water, and separating additional starch from the gluten.

6. The process of separating starch from gluten which comprises agitating gluten-carrying flour at least partly freed from bran with water to make a dough at a temperature of about 90° F. to 105° F., thereafter agitating the dough with added starch-bearing water derived from a subsequent operation in sufficient quantity to maintain a specific gravity of about 1.075 and a temperature of about between 40° F. and 80° F., separating the gluten from the major part of the starch, adding fresh water to the separated gluten, agitating the separated gluten in said added water, separating the gluten from the water, returning the separated water to provide the above starch-bearing water, and separately collecting the starch and gluten.

7. A feed mixer adapted to deliver dough, a first washer, a centrifugal pump for circulating dough suspension through the washer, a screen on which the gluten of the dough is screened from the suspension, a second washer, a second centrifugal pump for circulating the suspension through the second washer, a second screen on which the gluten is separated from the second suspension, a conduit carrying to the first washer the second suspension from which the gluten has been removed, means for further washing the gluten, and a conduit for conveying away the liquid drained from the first screen.

8. A feed mixer adapted to deliver dough, a first cold washer, a centrifugal pump for circulating dough suspension through the washer, a screen on which the gluten of the dough is screened from the suspension, a second cold washer, a second centrifugal pump for circulating the suspension through the second washer a second suspension carrying the separated gluten, a second screen on which the gluten is separated from the second suspension, a conduit carrying to the first washer the second suspension from which the gluten has been removed, a conduit for conveying away the liquid drained from the first screen, a washer for the gluten provided with heating means, a screen for separating the gluten from the wash water, and a conduit for returning the separated wash water to the first hot water.

9. The combination with a first washer of a dough mixer delivering to the washer, a centrifugal pump for circulating suspension in the first washer, a first screen for screening out gluten from starch suspension, a conduit for conducting away the screen suspension, a second washer, a second centrifugal pump circulating suspension in the second washer, a second screen for screening the gluten out of suspension in the second washer, a conduit for conveying the screened-out suspension to the first washer to supply water for the suspension therein, a washer for the separated gluten provided with heating means, and a drier for the gluten.

10. The method of separating starch and gluten which comprises mixing flour and water to form a dough, propelling said dough up an incline of more than fifteen degrees, decreasing the propelling action at intervals in the movement up the incline, agitating the dough delivered from the upper end of the incline in water to form a starch suspension and gluten agglomerates, and separating the agglomerated gluten from the starch suspension.

11. The method of separating starch and gluten which comprises mixing flour and water to form a dough, propelling said dough up an incline by means of a member having blades thereon which permit the less viscous dough to pass the outer parts of the blades to increase its consistency before delivery, agitating the dough delivered from the upper end of the incline in water to form a starch suspension and gluten agglomerates, and separating the agglomerated gluten from the starch suspension.

12. In an apparatus of the class described, the combination of an inclined channel, means operating in said channel to move dough up the inclined channel, said means having parts co-operating with the channel to form passages permitting the less viscous dough to flow by gravity down the channel whereby the less viscous dough is not delivered until it becomes sufficiently viscous, means for receiving the dough delivered from the upper part of the incline and for agitating the dough in water to form gluten agglomerates and starch suspension, and means for separating the gluten agglomerates from the starch suspension.

13. In an apparatus of the class described, the combination of an inclined channel, a member having spiral blades operating in said channel to move dough up the inclined channel, the blades of said member being spaced from the sides of the channel to permit the less viscous dough to flow past its blades by gravity down the channel whereby the less viscous dough is not delivered until it becomes sufficiently viscous, means for receiving the dough delivered from the upper part of the incline and for agitating the dough in water to form gluten agglomerates and starch suspension, and means for separating the gluten agglomerates from starch suspension.

14. In an apparatus of the class described, the combination with an inclined channel, of a member having interrupted spiral blades adapted to feed dough up the inclined channel, so that the blades feed up the more viscous dough and the interruptions in the blades permit the less viscous dough to flow backward and mix further at the interruptions, an agitating chamber for receiving the dough, means for agitating the dough in the chamber to form gluten agglomerates and starch suspension, and means for separating the gluten agglomerates from the starch suspension.

15. In a device of the class described, the combination with an agitation chamber adapted to hold a water suspension of flour, of an outside agitator, means for feeding dough to the chamber, connections whereby the agitator withdraws suspension from the chamber and returns it after agitation, a separating screen for separating starch water from gluten, and a conduit leading starch suspension from the chamber to the screen.

16. In a device of the class described, the combination with an agitation chamber adapted to hold a water suspension of flour, of a centrifugal pump outside the chamber, conduits between the chamber through which the pump circulates the suspension to agitate it, a separating screen for separating starch water from gluten, and a conduit leading starch suspension from the chamber to the screen.

17. The process of separating starch from gluten which comprises mixing wheat flour with water at a ratio of about 1 to 1, to form a dough, said water being limited in amount to produce a soft dough but insufficient to disperse the gluten, adding additional water while agitating to form a slurry of separated starch and small pieces of gluten, then screen separating the gluten from the starch.

18. The process of separating wheat starch from wheat gluten which comprises mixing wheat flour with water in the ratio of about 1 to 1 to form a dough, said water being limited in amount to produce a soft dough but insufficient to disperse the gluten, agitating the dough in the presence of additional water to subdivide the gluten into small pieces and to separate the starch from the gluten to form a starch slurry, the amount of additional water being limited so that the weight of the water in the starch slurry is only about four times the weight of the flour, and then screen separating the gluten from the starch slurry.

19. The process of separating wheat starch from wheat gluten which comprises mixing wheat flour with water in the ratio of about 1 to 1 to form a dough, said water being limited in amount to produce a soft dough but insufficient to disperse the gluten, agitating the dough in the presence of additional water to subdivide the gluten into small pieces and to separate the starch from the gluten to form a satrch slurry, the amount of additional water being limited so that the weight of the water in the starch slurry is only about four times the weight of the flour, then screen separating the gluten from the starch slurry, and then introducing the gluten into hot water to devitalize the gluten.

ACTON KEITH KILANDER.
LOU BUCK EDSALL.

REFERENCES CITED

The following references are of record in the file of this patent:

UNITED STATES PATENTS

| Number | Name | Date |
|---|---|---|
| 235,053 | Gassaway | Nov. 30, 1880 |
| 243,910 | Jebb | July 5, 1881 |
| 1,418,320 | Miller | June 6, 1922 |
| 1,535,811 | Briggs | Apr. 28, 1925 |
| 1,948,453 | Barbade | Feb. 20, 1934 |
| 2,089,404 | Newkirk | Aug. 10, 1937 |
| 2,149,802 | Thurber | Mar. 7, 1939 |
| 2,190,644 | Rawling | Feb. 20, 1940 |
| 2,326,195 | Bass | Aug. 10, 1943 |
| 2,380,874 | Schelling | July 31, 1945 |
| 2,388,902 | Callaghan | Nov. 13, 1945 |

FOREIGN PATENTS

| Number | Country | Date |
|---|---|---|
| 2,840 | Great Britain | 1881 |

OTHER REFERENCES

Shewfelt-Canadian Chemical & Process Ind., July 1944, pages 502–519 (Copy in Div. 43).